(12) United States Patent
Chen et al.

(10) Patent No.: US 7,024,072 B2
(45) Date of Patent: Apr. 4, 2006

(54) FIBER-OPTIC TUNABLE FILTER AND INTENSITY MODULATER

(75) Inventors: Nan-Kuang Chen, Taipei Hsien (TW); Sien Chi, Hsin-Chu (TW); Shiao-Min Tseng, Hsin-Chu (TW); Fu-Yu Tsai, Tao-Yuan (TW)

(73) Assignee: National Chiao Tung University, Hsin-Chu (TW)

( * ) Notice: Subject to any disclaimer, the term of this patent is extended or adjusted under 35 U.S.C. 154(b) by 102 days.

(21) Appl. No.: 10/826,741

(22) Filed: Apr. 16, 2004

(65) Prior Publication Data

US 2004/0208449 A1 Oct. 21, 2004

(30) Foreign Application Priority Data

Apr. 21, 2003 (TW) .............................. 92109274 A

(51) Int. Cl.
*G02B 6/26* (2006.01)

(52) U.S. Cl. .......................................... 385/30; 385/39
(58) Field of Classification Search .................. 385/30
See application file for complete search history.

(56) References Cited

U.S. PATENT DOCUMENTS 6,944,369 B1* 9/2005 Deliwala ...................... 385/30

OTHER PUBLICATIONS

Barclay, P.E.; Srinivasan, K.; Borselli, M.; Painter, O. "Experimental Demonstration of Evanescent Coupling from an Optical Fibre Tapers to Photonic Crystal Waveguides." Electronics Letters. vol. 39, Issue 11, May 29, 2003 Page (s):842-844.*

* cited by examiner

*Primary Examiner*—John D. Lee
*Assistant Examiner*—Rhonda S. Peace
(74) *Attorney, Agent, or Firm*—Volpe and Koenig, P.C.

(57) ABSTRACT

A fiber-optic tunable filter and an intensity modulator respectively includes: a fiber having a polished surface and an evanescent-field; and a photonic crystal having plural cavities and a filler filled therein and attached to the polished surface, wherein the plural cavities and the filler decide a photonic band-gap of the photonic crystal and the photonic band-gap is adjusted to reflect a light with a specific wavelength through the evanescent interaction with the photonic crystal material. Based on the fiber side-polishing technique, all kinds of fiber active and passive devices are able to be manufactured easily, especially for a high speed intensity modulator using an EO (Electro-Optic) polymer as the filler.

12 Claims, 11 Drawing Sheets

FIBER-OPTIC TUNABLE FILTER AND INTENSITY MODULATER

FIELD OF THE INVENTION

The present invention is related to a fiber-optic filter and an intensity modulator, in particular to a fiber-optic tunable filter and an intensity modulator based on the photonic crystal structure.

BACKGROUND OF THE INVENTION

Total-internal-reflection is the working principle of the light transmission in a fiber in which a few amount of the electromagnetic field is penetrated outside the vicinity of the guiding core with exponentially decayed field distribution, called an evanescent field. For a side-polished fiber, the evanescent field of the guided light can be accessed since a portion of the cladding is removed. The guided light can interact with an external medium through evanescent coupling and will be well-confined to propagate forward as long as the total-internal-reflection criterion is satisfied. Thus, the refractive index of the medium placed against the polished surface should be smaller than the effective refractive index of the side-polished fiber.

As everyone knows, the refractive index of the fused silica fiber is around 1.45 for 1.55 μm wavelength. In contrast to most of the physical substances, the refractive index of the fused silica is too low for the side-polished fiber to find a suitable medium to achieve a tunable wavelength filter, an intensity modulator or an optical amplifier. As a result, to develop variant kinds of the fiber components for fiber-optic communications is seriously restricted.

A tunable wavelength filter plays an important role in bandwidth provisioning and management for the photonic networks. It transmits the required wavelength(s) and rejects the rest in front of the receiver. Needless to say, a tunable filter is convenient and cost-effective since pluralities of the fixed filters are replaced.

Presently, several kinds of fabrication methods are demonstrated to make tunable filters, such as photo-induced or acoustic-optic fiber grating, Fabry-Perot resonantor, thin-film or Mach-Zehnder interferometer. However, the above methods are highly related to a stable mechanical system whose precision and reliability are questionable.

Particularly, the tuning range of the fiber Bragg grating is normally less than 30 nm through a repeated pulling or compressing, which could shorten the lifetime of the grating.

As to the Fabry-Perot filter, it is wideband tunable. However, the critical requirements on mechanical stability and the demand of an expensive controller have made this filter difficult to be widespread and popular.

The tunable thin-film filter is not suitable for a high density wavelength-division-multiplexing communication system because the working principle of this filter is to rotate the filter until the required angle and the corresponding wavelength are selected. The amounts of coating layers of this filter for high density system is more than 200 at least and therefore the temperature control is extremely important to keep the stable interferences.

The acousto-optic tunable filter exhibits a tuning range of wider than 100 nm wavelength based on photo-elastic effect. The propagating acoustic wave induces a periodic index grating that diffracts certain guided wavelength. However, the exciting efficiency and propagating distance of the acoustic wave are the concerned issues. The accuracy of the induced grating period would also be a challenge. Moreover, the high frequency signal generator for exciting the acoustic wave is an extremely expensive instrument. Therefore, the acousto-optic tunable filter is difficult to be popularized.

Many efforts have been done to solve the above problems in the following studies:

A method of employing a fan-shaped grating in the evanescent-field area of the side-polished fiber and using a precision micro-meter to move the grating for adjusting the grating period was disclosed by Sorin with the Stanford University in 1985. A tunable fiber filter with a wavelength tuning range of 65 nm, a reflectivity of 88% and a FWHM (Full Width at Half Maximum) of 1 nm is manufactured by this method. However, the tuning through a mechanical method damages the fiber probably and it would be a question to guarantee the accuracy and reproduce the initial status. Hence this method is impractical.

X.-Z. Lin et al. with the Beijing University (1994) utilized a magnetic material for being as a substrate of the polished fiber and then fabricated a surface-relief grating on the polished fiber. When a magnetic field of high intensity is applied to the substrate, the grating period is compressed accordingly and thus an electrical-controlled tunable filter is achieved. However, the method is not practical because only a wavelength span of 1.3 nm is achieved while applying a high intensity magnetic field of up to 0.1 T.

A method of employing the piezoelectric effect to generate a force to pull and compress the grating by applying a high voltage to the fiber grating placed on a piezoelectric material, was disclosed by A. Iocco et al. with the Swiss Federal Institute of Technology in 1997. The grating period is adjusted by the tension and the compression and a wavelength tuning range of 15~30 nm is obtained by this method. However, the piezoelectric material needs a high voltage to drive and therefore lacks of the practicability.

Katsumi Takano et al. with the Yamagata University in Japan (2001) disclosed a wavelength tuning method which utilizes a MEMS (Micro-Electro Mechanical Systems) technique to rotate the angle of the defect in a photonic crystal so as to change the wavelength. However, this method is extremely complicated and difficult to be implemented.

In order to overcome the foresaid drawbacks in the prior art, a fiber-optic tunable filter and an intensity modulator are provided in the present invention.

SUMMARY OF THE INVENTION

The main purpose of the present invention is to provide a fiber-optic tunable filter which includes: a fiber having a polished surface and an evanescent-field; and a photonic crystal material attached to the polished surface and having a photonic band-gap, wherein the photonic band-gap is adjusted to reflect a specific wavelength returning to the fiber via the evanescent interaction with the material having photonic crystal structure. The reflection resulted from photonic band-gap is different than that from the total-internal-reflection and therefore the refractive index of the external medium is not necessary to be lower than the effective refractive index of the side-polished fiber anymore.

In accordance with the present invention, the polished surface is fabricated by a polishing method.

Preferably, the polished surface is fabricated by a laser-paring method.

Preferably, the photonic crystal material further has plural cavities and a filler filled in the plural cavities.

Preferably, the filler is an EO (Electro-Optical) polymer.

Preferably, the refractive index of the filler is adjusted via one of the methods including an electro-optic effect, a thermo-optic effect, an acousto-optic effect and an optical nonlinear effect.

Preferably, the volume of the filler is adjusted by one selected from a group consisting of a thermo-optic effect, a piezo-electric effect and an acousto-optic effect.

Preferably, the photonic band-gap is tuned by one of a volume and a refractive index of the filler.

Preferably, the photonic band-gap is one of a complete photonic band-gap and an incomplete photonic band-gap.

Preferably, the plural cavities are arranged in one of a periodic manner and an a periodic manner.

Preferably, the plural cavities are arranged in a periodic manner parallel to a core of said fiber.

Preferably, the plural cavities are arranged in a periodic manner perpendicular to a core of the fiber.

Another purpose of the present invention is to provide a fiber-optic tunable filter which includes: a fiber having a polished surface and an evanescent-field; and a photonic crystal having plural cavities and a filler filled therein and attached to the polished surface, wherein the plural cavities and the filler decide a photonic band-gap of the photonic crystal and the photonic band-gap is adjusted to reflect a light with a specific wavelength via evanescent interaction with the material having photonic crystal structure.

Another purpose of the present invention is to provide an optical intensity modulator which includes: a fiber having a polished surface and an evanescent-field; and a photonic crystal material attached to the polished surface and having a photonic band-gap, wherein the photonic band-gap is adjusted to control a path of a light with a specific wavelength in the evanescent-field when the evanescent-field is penetrated at the polished surface to contact the photonic crystal.

In accordance with the present invention, the polished surface is fabricated by a polishing method.

Preferably, the polished surface is fabricated by a laser-paring method.

Preferably, the photonic crystal material further has plural cavities and a filler filled in the plural cavities.

Preferably, the filler is an EO (Electro-Optical) polymer.

Preferably, the refractive index of the filler is adjusted via one of the methods including an electro-optic effect, a thermo-optic effect, an acousto-optic effect and an optical nonlinear effect.

Preferably, the volume of the filler is adjusted by one selected from a group consisting of a thermo-optic effect, a piezo-electric effect and an acousto-optic effect.

Preferably, the photonic band-gap is tuned by one of a volume and a refractive index of the filler.

Preferably, the photonic band-gap is one of a complete photonic band-gap and an incomplete photonic band-gap.

Preferably, the plural cavities are arranged in one of a periodic manner and an a periodic manner.

Preferably, the plural cavities are arranged in a periodic manner parallel to a core of said fiber.

Preferably, the plural cavities are arranged in a periodic manner perpendicular to a core of the fiber.

Another purpose of the present invention is to provide an optical intensity modulator which includes: a fiber having a polished surface and an evanescent-field; and a photonic crystal having plural cavities and a filler filled therein and attached to the polished surface, wherein the plural cavities and the filler decide a photonic band-gap of the photonic crystal and the photonic band-gap is tuned to control a path of a light with a specific wavelength in the evanescent-field when the evanescent-field is penetrated at the polished surface to contact the photonic crystal.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
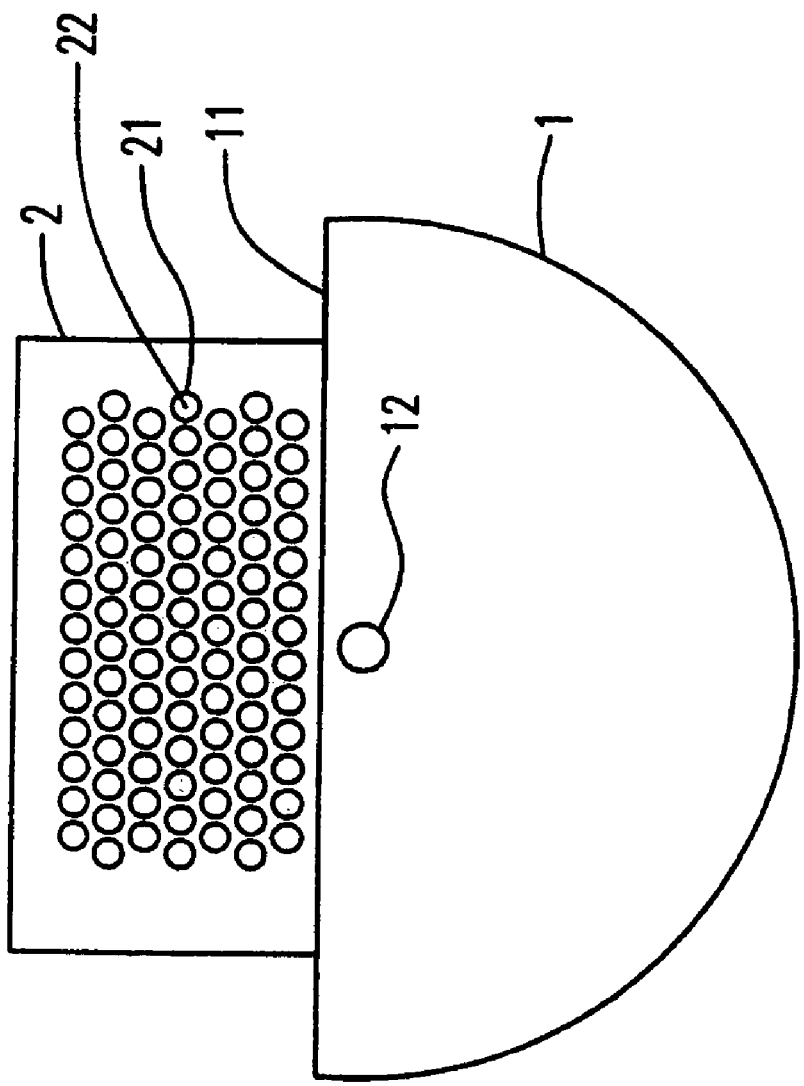
FIG. 1(a) is a diagram illustrating the structure of the photonic crystal that the plural cavities are arranged in a periodic manner parallel to a core of the fiber according to a preferred embodiment of the present invention.

Please refer to FIG. 1(a), which illustrates the structure of the photonic crystal used in the fiber-optic tunable filter according to a preferred embodiment of the present invention. The fiber 1 is included in the fiber-optic tunable filter and has a guiding core 12, a polished surface 11 of an evanescent field and a photonic crystal 2 having the plural cavities 21. The polished surface 11 is formed by one of a polishing method and a laser-paring method and then the photonic crystal material 2 is attached on the polished surface 11. The photonic crystal material 2 has the plural cavities 21 and an EO (Electro-Optical) polymer 22 is filled in the plural cavities 21. In which, the refractive index of the EO polymer is changed by the electro-optic effect.

Figure 1B:
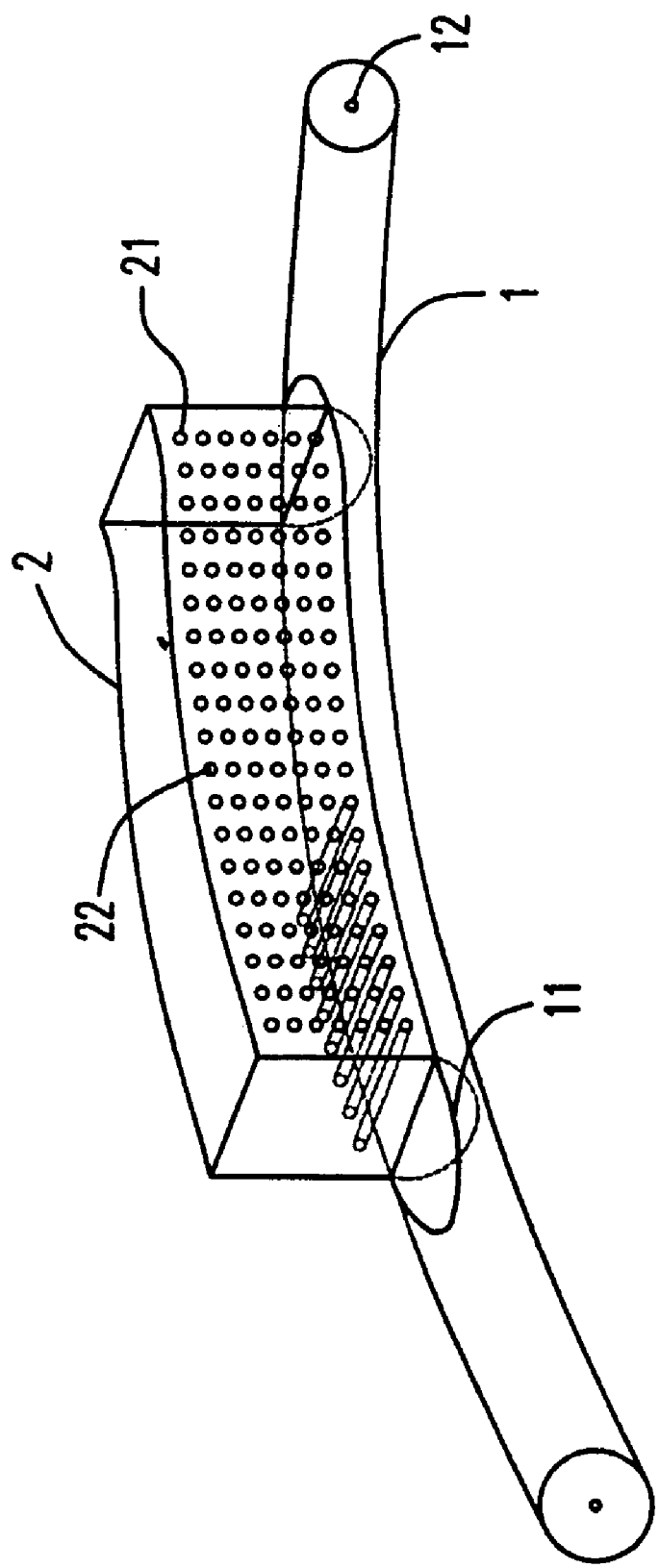
FIG. 1(b) is a diagram illustrating the structure of the photonic crystal that the plural cavities are arranged in a periodic manner perpendicular to a core of the fiber according to a preferred embodiment of the present invention.

Additionally, the plural cavities 21 of the photonic crystal material 2 are arranged in a periodic manner or an a periodic manner. However, for having a broader wavelength tuning range, the periodic manner is preferred. The plural cavities 21 arranged in the periodic manner are parallel to the guiding core 12 of the fiber 1, as shown in FIG. 1(a), or perpendicular to the guiding core 12 of the fiber 1, as shown in FIG. 1(b).

The refraction index of the EO polymer 22 filled in the plural cavities 21 are adjusted by one selected from a group consisting of a thermo-optic effect, an electro-optic effect, an acousto-optic effect and an optical nonlinear effect. On the other hand, the volume of the EO polymer 22 filled in the plural cavities 21 are adjusted by one selected from a group consisting of a thermo-electric effect, a piezo-electric effect and an acousto-optic effect.

Therefore, the wavelength range of the photonic band-gap of the photonic crystal material 2 is tunable by adjusting the refractive index and the volume of the EO polymer 22. When the guided wavelengths interact with the photonic crystal material via evanescent field, the light having a specific wavelength is able to penetrate through the photonic crystal material 2 or being blocked and then reflected back to the guiding core 12 by the tunable band-gap of the photonic crystal material 2. In other words, the light having a specific wavelength, which falls in the wavelength range of the photonic band-gap, in the evanescent field is reflected from the photonic crystal material 2 to the guiding core 12 for propagating forward by the band-gap blocking and the light having a different wavelength from the wavelength range of the photonic band-gap leaks away from the guiding core 12 and then enters and penetrates through the photonic crystal material 2. Hence a fiber-optic tunable filter having the functions of optical dividing and filtering is provided to filter the light having a specific wavelength.

Figure 2:
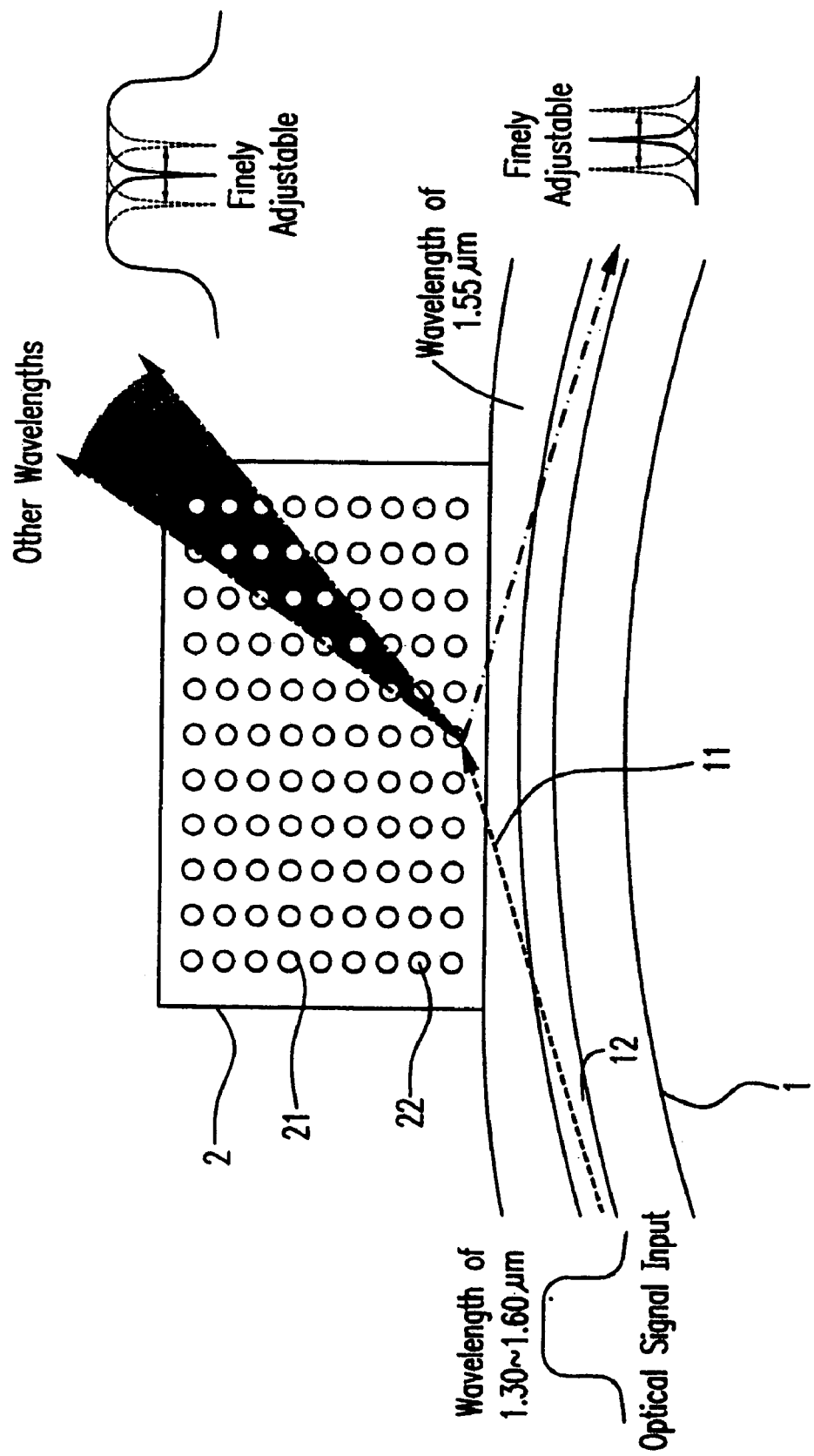
FIG. 2 is a diagram illustrating the operation of the fiber-optic filter and the intensity modulator according to a preferred embodiment of the present invention.

Please refer to FIG. 2, which illustrates the operation of the fiber-optic filter and the intensity modulator according to a preferred embodiment of the present invention. The volume and the refraction index of the EO polymer 22 are adjusted to make the photonic crystal material 2 have a photonic band-gap of 1.55 μm. As a result, when a light having wavelengths of 1.30~1.60 μm is launched to the guiding core 12, the wavelength of 1.55 μm is filtered out and propagated forward in the fiber 1. Simultaneously, the light having other wavelengths is deviated from the fiber 1 and penetrates through the photonic crystal material 2.

Figure 3A:
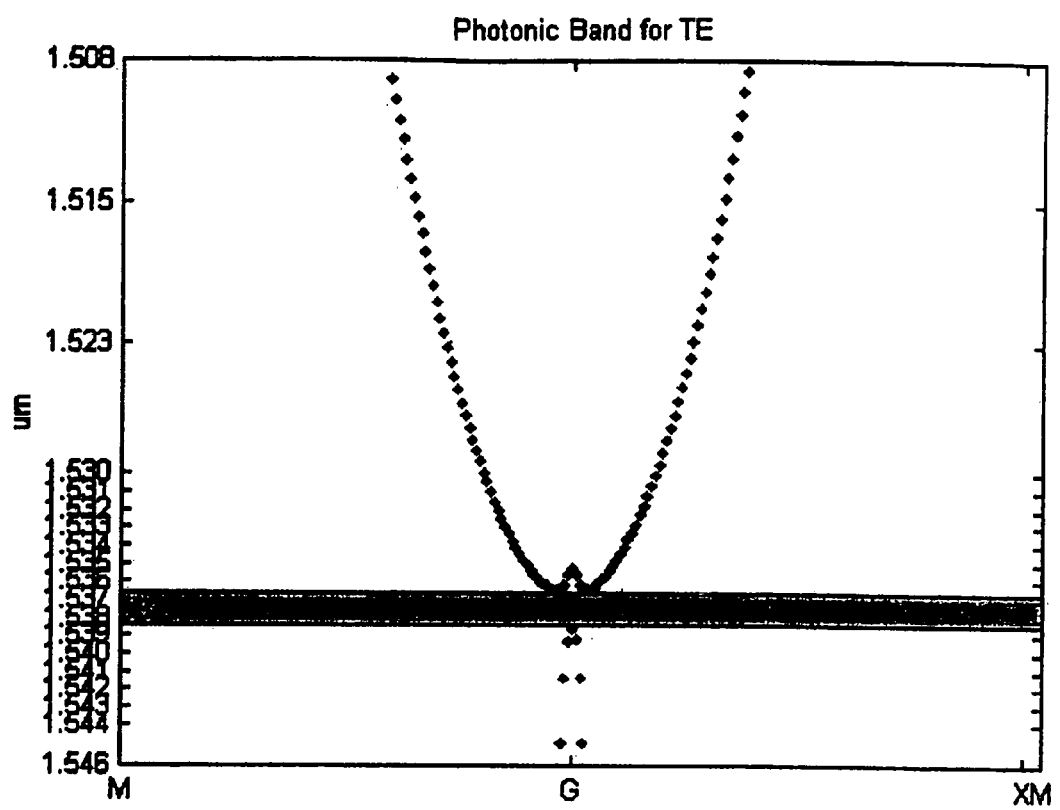
FIG. 3(a) is a diagram showing the band-gap distribution of the photonic crystal used in the fiber-optical tunable filter according to a preferred embodiment of the present invention, wherein the refraction index of the filler is original and the light is at a TM state of the polarization.
Figure 3B:
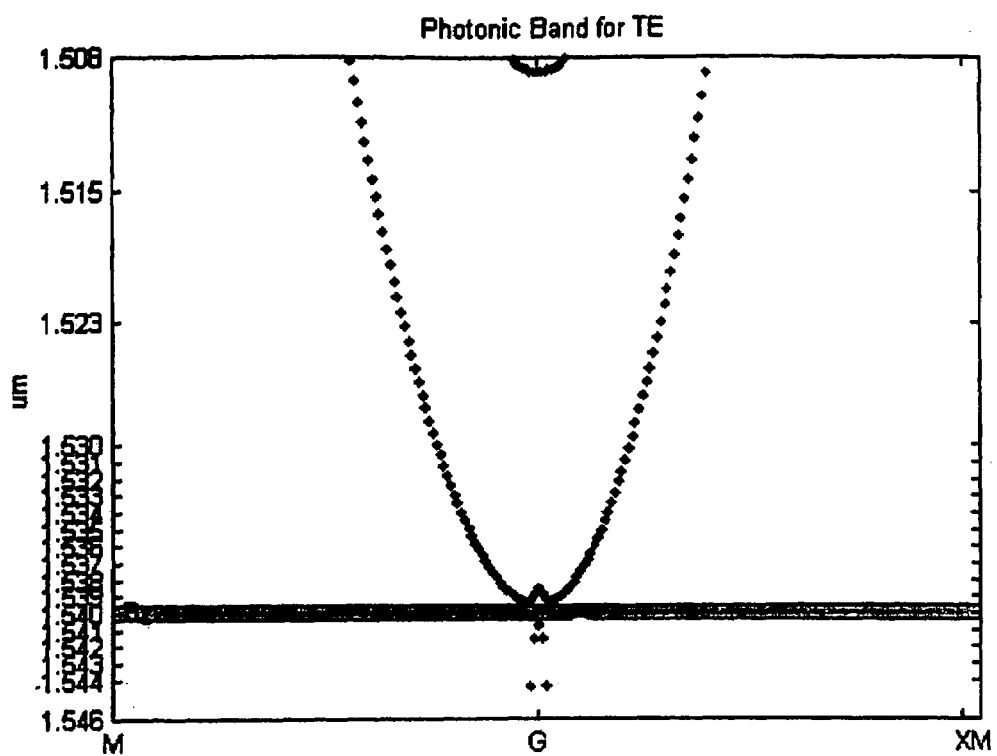
FIG. 3(b) is a diagram showing the band-gap distribution of the photonic crystal used in the fiber-optical tunable filter according to a preferred embodiment of the present invention, wherein the refraction index of the filler is increased and the light is at a TM state of the polarization.
Figure 3C:
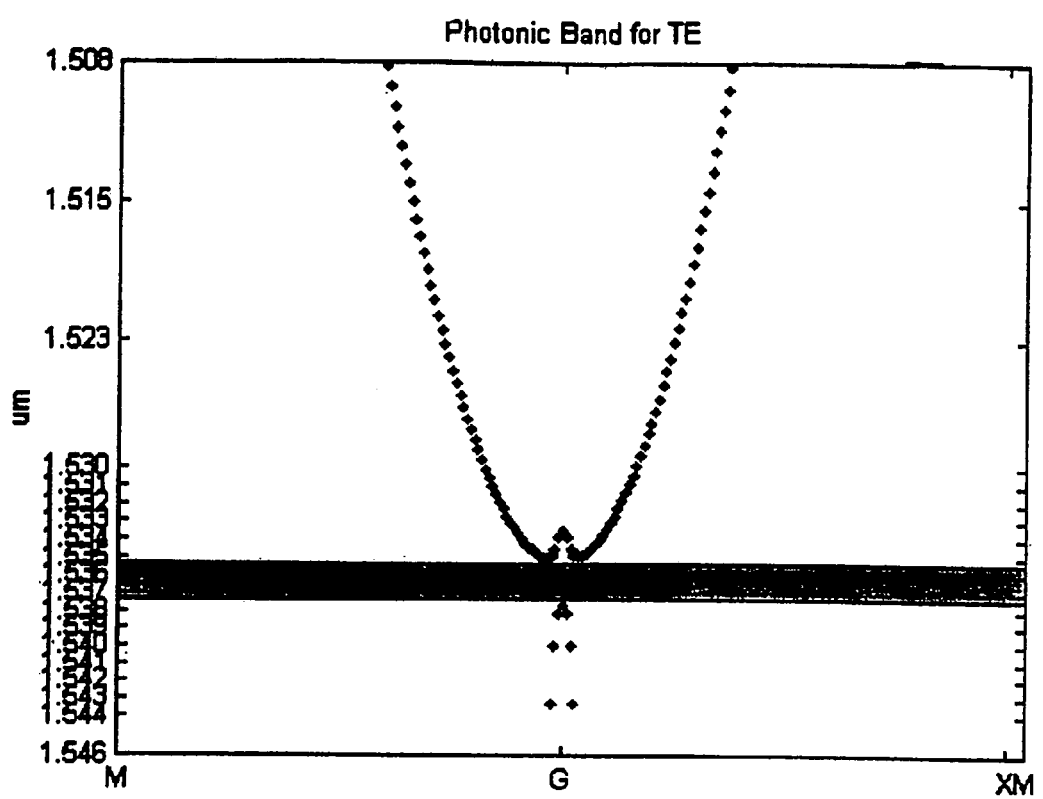
FIG. 3(c) is a diagram showing the band-gap distribution of the photonic crystal used in the fiber-optical tunable filter according to a preferred embodiment of the present invention, wherein the refraction index of the filler is decreased and the light is at a TM state of the polarization.
Figure 4A:
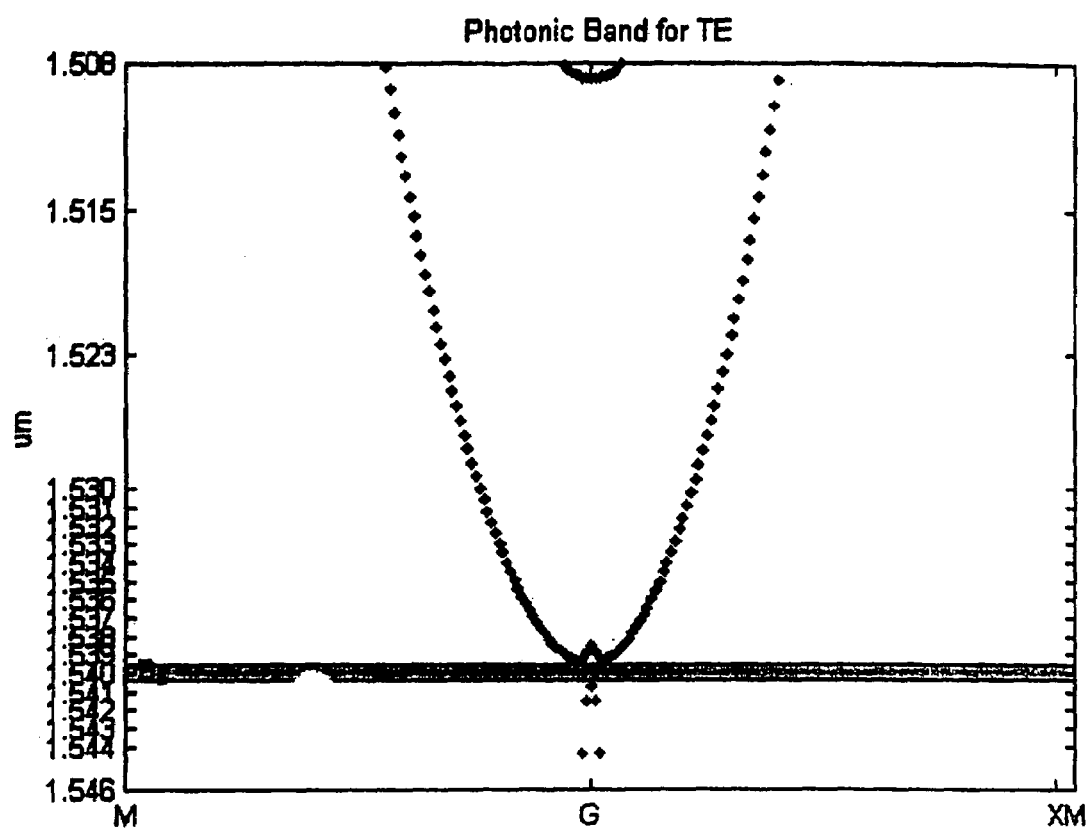
FIG. 4(a) is a diagram showing the band-gap distribution of the photonic crystal used in the fiber-optical tunable filter according to a preferred embodiment of the present invention, wherein the volume of the filler is original and the light is at a TM state of the polarization.
Figure 4B:
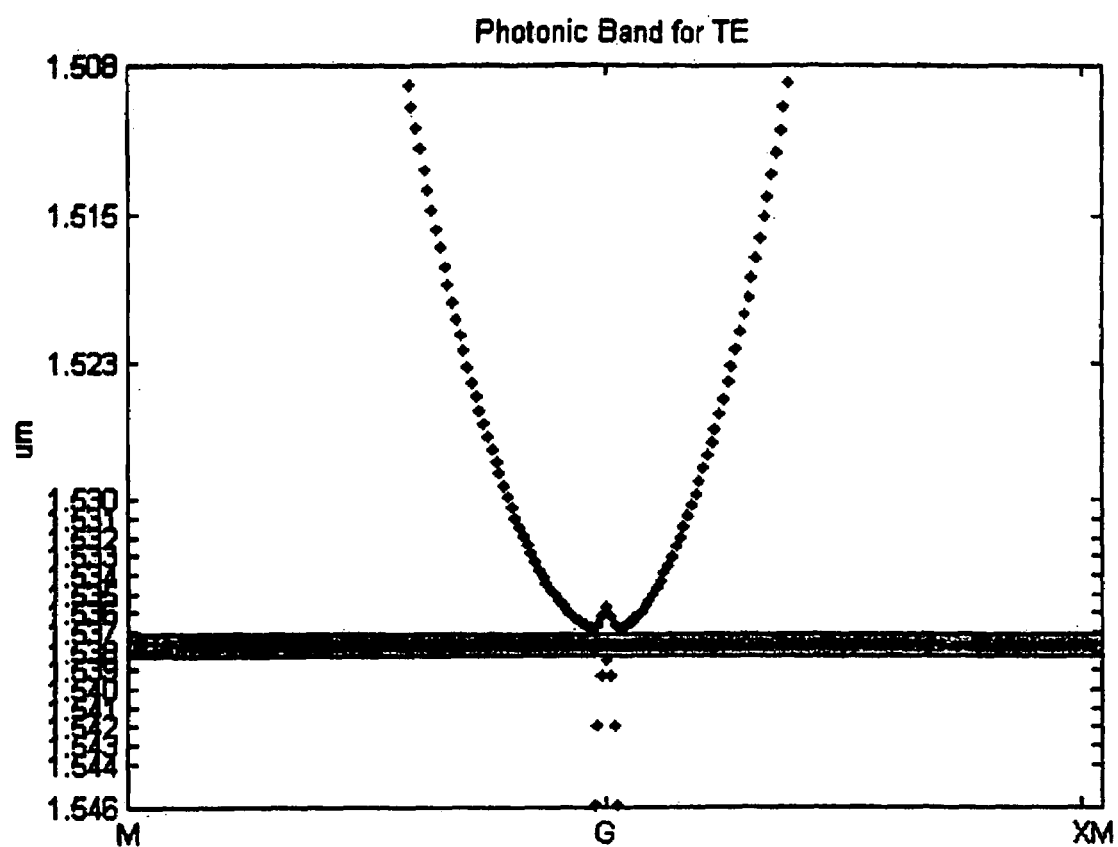
FIG. 4(b) is a diagram showing the band-gap distribution of the photonic crystal used in the fiber-optical tunable filter according to a preferred embodiment of the present invention, wherein the volume of the filler is increased and the light is at a TM state of the polarization.
Figure 4C:
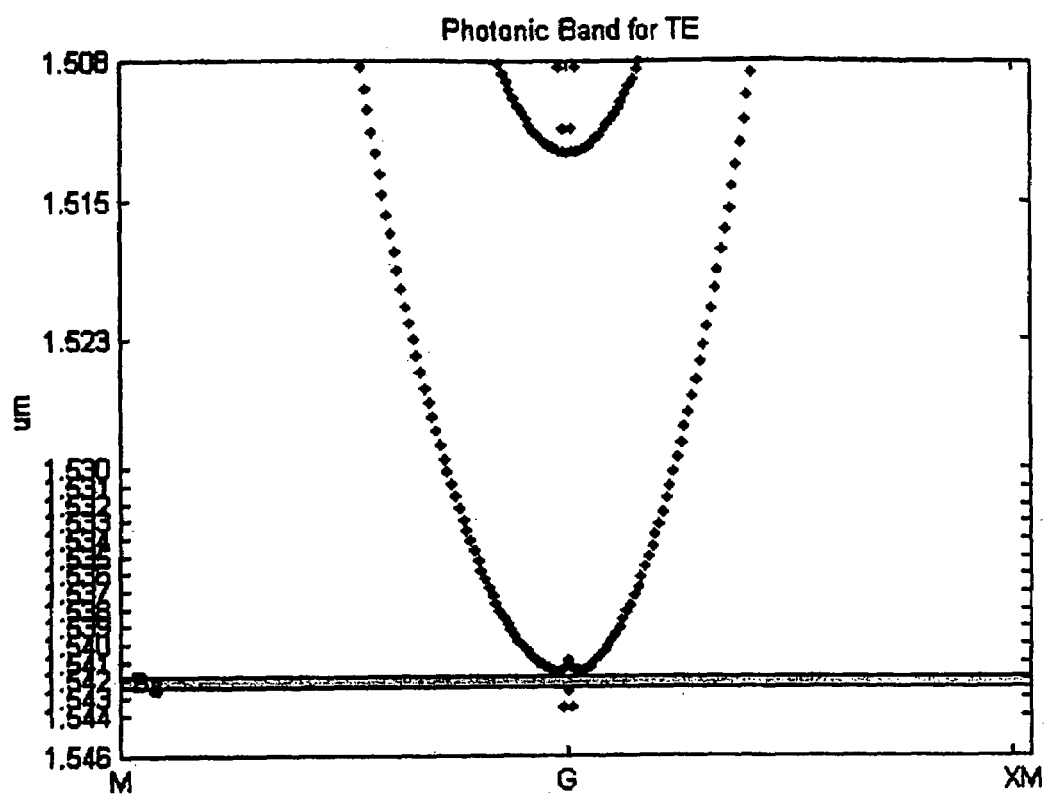
FIG. 4(c) is a diagram showing the band-gap distribution of the photonic crystal used in the fiber-optical tunable filter according to a preferred embodiment of the present invention, wherein the volume of the filler is decreased and the light is at a TM state of the polarization.

Please refer to FIGS. 3(a)–(c), which show the band-gap distribution of the photonic crystal used in the fiber-optic tunable filter according to a preferred embodiment of the present invention. Based on the diagrams, the photonic band-gap (the wavelength range that the light is propagated forward in the fiber 1 and can not penetrate through the photonic crystal material) is tuned downward and upward with the refraction index increased and decreased of the filler in the plural cavities 21, respectively. Moreover, a reverse corresponding relation between the photonic band-gap and the volume of the filler is shown in FIGS. 4(a)–(c).

Another embodiment of the present invention according to the above principle is an intensity modulator. Please refer to FIG. 2. The difference from the fiber-optic tunable filter is that the photonic band-gap is tunable to control the path of a light having a specific wavelength by adjusting the refractive index and the volume of the EO polymer 22 and thus the disappearance and the appearance for the specific wavelength range of the photonic band-gap can be switched. In other words, the evanescent field of the light having a specific wavelength will not be reflected by the photonic band-gap, whose wavelength range is tuned to be different from the specific wavelength of the light, and then will leak out from the guiding core 12, enter and penetrate through the photonic crystal material 2 or the light can be blocked by another tuned photonic band-gap, whose wavelength range is tuned to be adapted for the specific wavelength of the light, and then will be reflected back to the guiding core 12 and propagate forward. The optical intensity can be modulated by such means for the evanescent field and a terminal receiver (not shown) of the fiber 1. Therefore, the present invention provides a practicable fabricating manner not only for a fiber-optic tunable filter, but also for an intensity modulator.

Figure 5A:
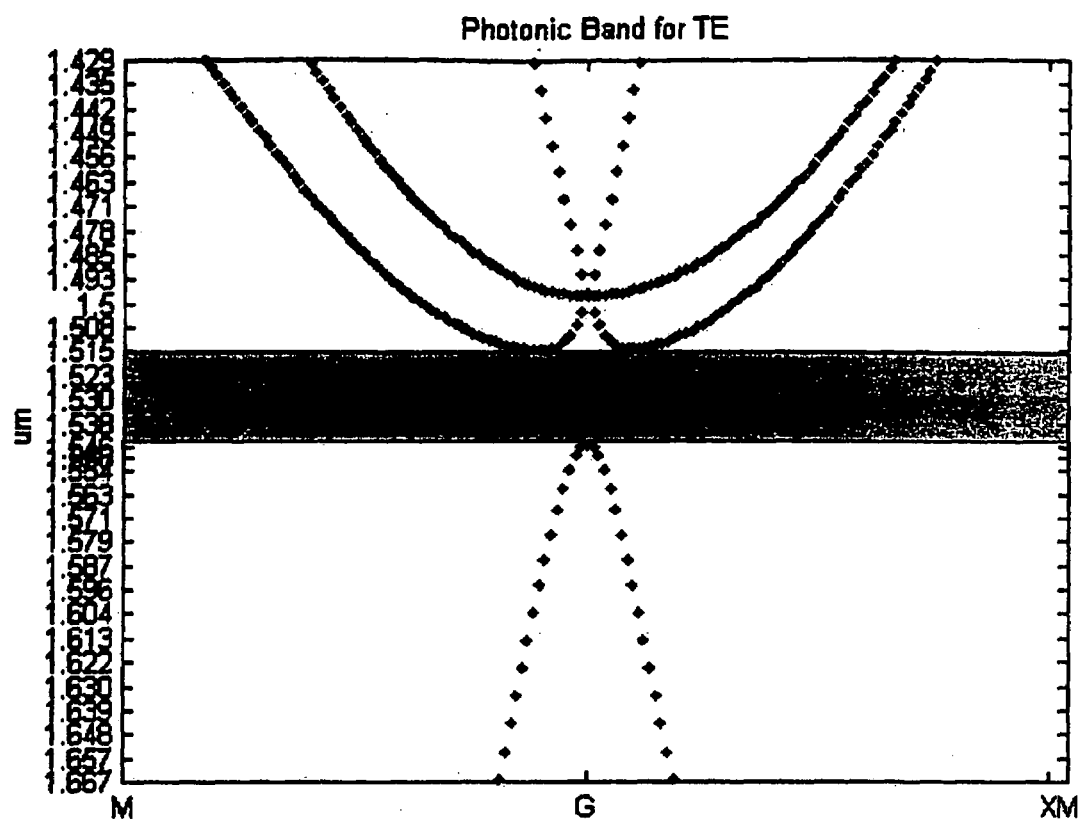
FIG. 5(a) is a diagram showing the band-gap distribution of the photonic crystal used in the intensity modulator according to a preferred embodiment of the present invention, wherein the band-gap of the photonic crystal is transparent and the light is at a TM state of the polarization.
Figure 5B:
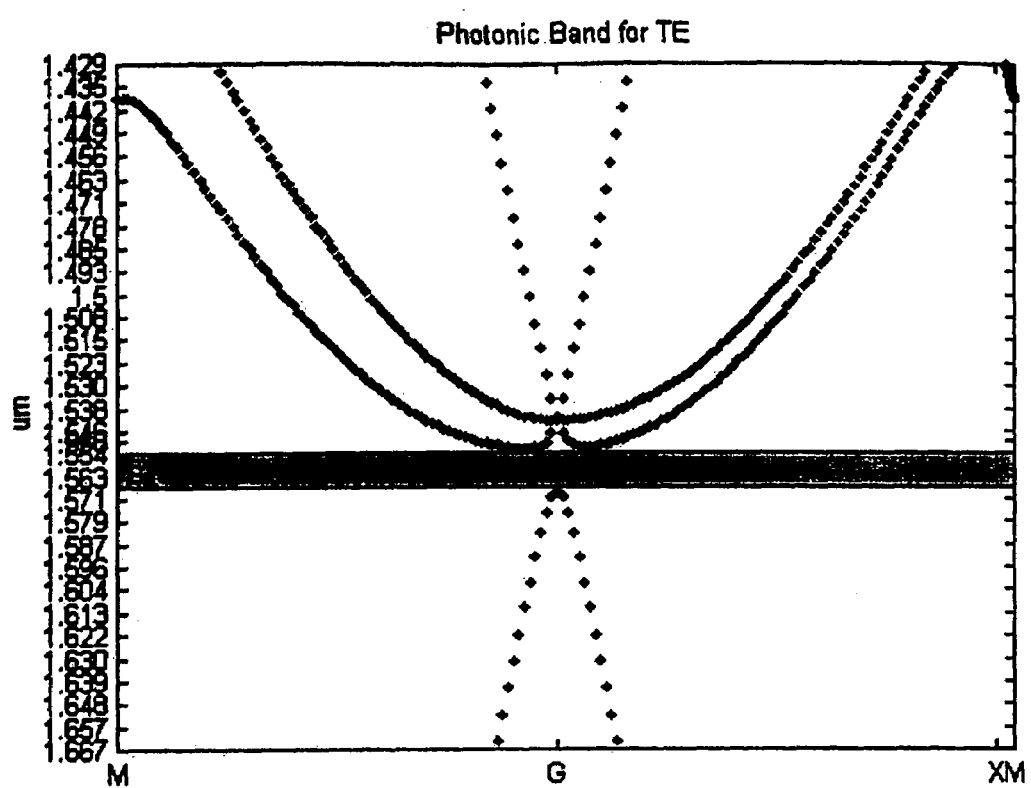
FIG. 5(b) is a diagram showing the band-gap distribution of the photonic crystal used in the intensity modulator according to a preferred embodiment of the present invention; wherein the band-gap of the photonic crystal is opaque and the light is at a TM state of the polarization.

Please refer to FIG. 5(a) and (b), which show the band-gap distribution of the photonic crystal used in the intensity modulator according to a preferred embodiment of the present invention. The photonic band-gap is tuned from the first range, 1.515~1.546 μm, to the second range, 1.554~1.567 μm, by adjusting the refractive index and the volume of the EO polymer. For the wavelengths in the first range, they are well-confined to propagate in core when photonic band-gap is tuned to cover the first range. Otherwise, they will leaky out the fiber while the photonic band-gap is tuned away. Accordingly, the intensity of the first range wavelengths can be modulated by tuning the photonic band-gap stayed or away.

According to the above, the drawbacks of the prior art are not existed in the filter and the modulator provided in the present invention. A fiber-optic tunable device is fabricated by utilizing the photonic band-gap of a photonic crystal combining a side-polished fiber and has the advantages as the following:

Firstly, the present invention solves a serious problem of the conventional side-polished fiber functioned by a total-internal-reflection, i.e. a material having a lower refraction index than that of the fiber is required.

Secondly, the most advanced characteristic of the present invention is that the photonic band-gap is tunable by adjusting the refraction index and the volume of the filler filled in the plural cavities. The fiber-optic tunable filter related to the present invention is more progressive than that of the prior art.

Thirdly, the photonic band-gap provided in the present invention includes a complete photonic band-gap and an incomplete photonic band-gap. A so-called complete photonic band-gap is that the light having a specific wavelength is unable to pass through the photonic crystal in all directions. On the contrary, a so-called incomplete photonic band-gap is that the light having a specific wavelength will be blocked and reflected by the photonic crystal only in a specific range of directions. Undoubtedly, it is more difficult to fabricate a photonic crystal having a complete photonic band-gap in all directions than an incomplete one. However, another advantage of the present invention is that by attaching the photonic crystal to the polished surface of the polished fiber, an optical signal has a transmitting angle of about 87.5° in the fiber. As long as the photonic band-gap of the photonic crystal falls into this range, the purpose is achieved. Therefore, a photonic crystal having a complete photonic band-gap in all directions is not required to be used in the filter.

According to the above, it is clear that a fiber-optic tunable device is fabricated by utilizing the photonic band-gap of a photonic crystal combining a side-polished fiber and it is practical to manufacture other tunable fiber active and passive devices based on the present invention. Hence, the present invention not only has a novelty and a progressive nature, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A fiber-optic tunable filter, comprising:
   a fiber having a polished surface and an evanescent-field; and
   a photonic crystal material attached to said polished surface and having a photonic band-gap, wherein said photonic band-gap is adjusted to reflect a specific wavelength returning to said fiber.

2. The fiber-optic tunable filter according to claim 1, wherein said polished surface is fabricated by one of a polishing method and a laser-paring method.

3. The fiber-optic tunable filter according to claim 1, wherein said photonic crystal material further has plural cavities and a filler filled in said plural cavities.

4. The fiber-optic tunable filter according to claim 3, wherein said filler is an EO (Electro-Optic) polymer.

5. The fiber-optic tunable filter according to claim 3, wherein said photonic band-gap is adjusted by one of a volume and a refractive index of said filler.

6. The fiber-optic tunable filter according to claim 3, wherein said plural cavities is arranged in one of a periodic manner and an a periodic manner.

7. The fiber-optic tunable filter according to claim 6, wherein said plurality of cavities arranged in a periodic manner is parallel to a core of said fiber.

8. The fiber-optic tunable filter according to claim 6, wherein said plural cavities arranged in a periodic manner is perpendicular to a core of said fiber.

9. The fiber-optic tunable filter according to claim 5, wherein said volume of said filler is adjusted by one selected from a group consisting of a thermo-optic effect, a piezo-electric effect and an acousto-optic effect.

10. The fiber-optic tunable filter according to claim 5, wherein said refractive index of said filler is adjusted by one selected from a group consisting of a electro-optic effect, a thermo-optic effect, an acousto-optic effect and an optical nonlinear effect.

11. The fiber-optic tunable filter according to claim 1, wherein said photonic band-gap is one of a complete photonic band-gap and an incomplete photonic band-gap.

12. An optical intensity modulator, comprising:
    a fiber having a polished surface and an evanescent-field; and
    a photonic crystal material attached to said polished surface and having a photonic band-gap, wherein said photonic band-gap is adjusted to control a path of a specific wavelength in said evanescent-field when said evanescent-field is penetrated at said polished surface to contact said photonic crystal.

* * * * *